April 15, 1924.                                                                                           1,490,639
C. SCHAEFFER
BRAKE FOR MOTOR AND OTHER VEHICLE WHEELS AND ESPECIALLY FOR STEERING WHEELS
Filed Jan. 16, 1923     2 Sheets-Sheet 1

INVENTOR:
Charles Schaeffer
BY
ATTORNEY

April 15, 1924.  1,490,639
C. SCHAEFFER
BRAKE FOR MOTOR AND OTHER VEHICLE WHEELS AND ESPECIALLY FOR STEERING WHEELS
Filed Jan. 16, 1923   2 Sheets-Sheet 2
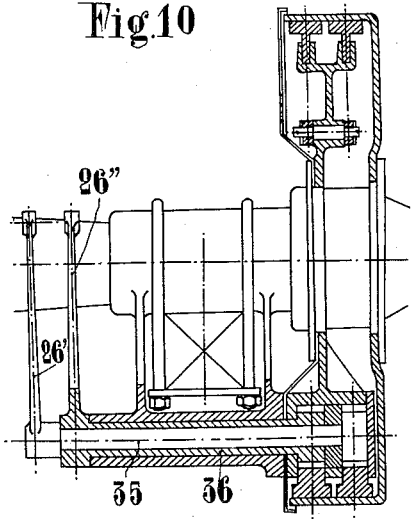
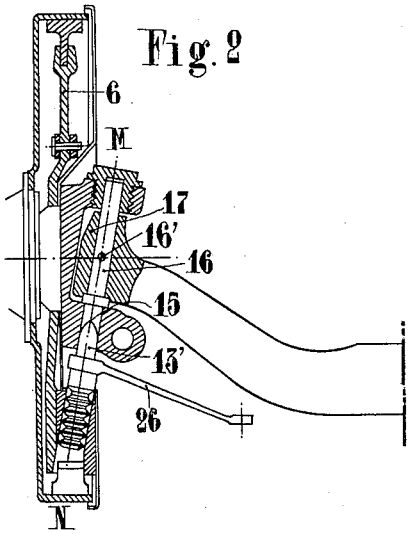
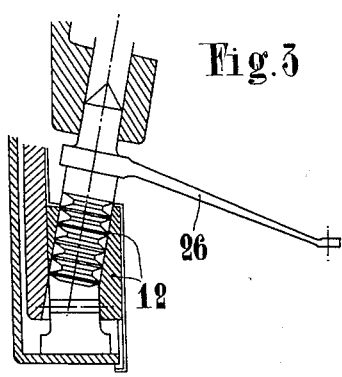
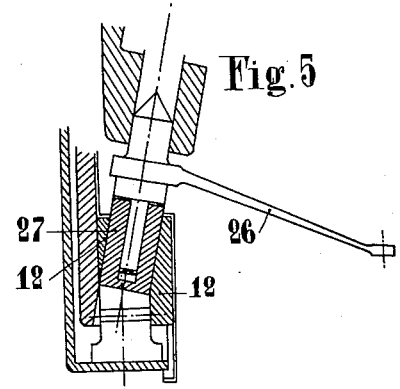
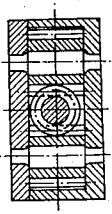
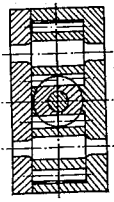
INVENTOR:
Charles Schaeffer
BY
ATTORNEY Patented Apr. 15, 1924.

1,490,639

UNITED STATES PATENT OFFICE.

CHARLES SCHAEFFER, OF PARIS, FRANCE, ASSIGNOR TO ANCIENS ETABLISSEMENTS PANHARD & LEVASSOR, OF PARIS, SEINE, FRANCE.

BRAKE FOR MOTOR AND OTHER VEHICLE WHEELS AND ESPECIALLY FOR STEERING WHEELS.

Application filed January 16, 1923. Serial No. 613,022.

*To all whom it may concern:*

Be it known that I, CHARLES SCHAEFFER, a citizen of the French Republic, residing at 19 Avenue d'Ivry, Paris, France, have invented certain new and useful Improvements in Brakes for Motor and Other Vehicle Wheels and Especially for Steering Wheels, of which the following is a specification.

The object of this invention is a brake for motor and other vehicle wheels, and especially for steering wheels, the brake being essentially characterized by a rack or other control member the rectilinear shifting of which in a plane passing, for instance, through the axis of the steering knuckle, forces the two ends of an open segment apart and causes the latter to be applied on the whole surface of the drum through links suitably articulated for the purpose.

Said control device permits, furthermore, braking to be effected whatever the setting of the wheels, when of course these are steering wheels.

In order to make the invention more clearly understood, there have been illustrated as examples, several embodiments thereof in and by the appended drawings wherein:

Figure 2 is a sectional view according to line A—B of Figure 1;

Figures 3 and 4 are sectional views on an enlarged scale showing the control device represented by Figure 1;

Figure 1:
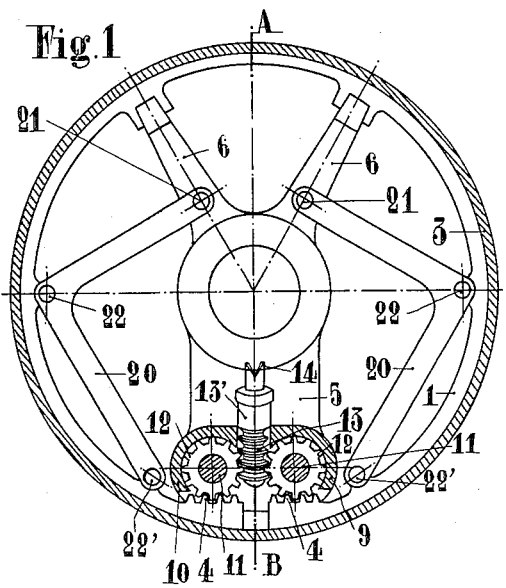
Figure 1 is a view, partly sectional, partly in elevation, of the improved brake applied to a steering wheel.
Figure 9:
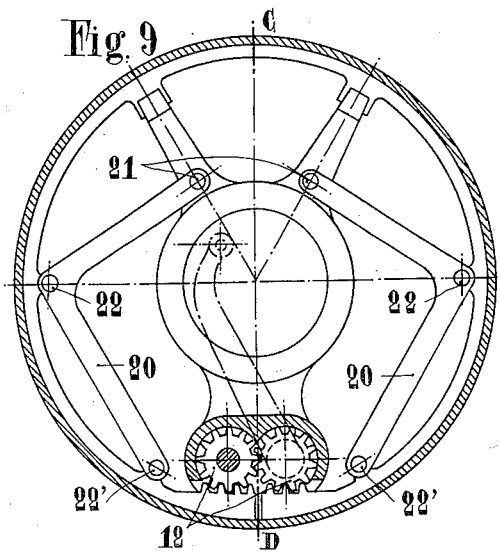
Figure 7:
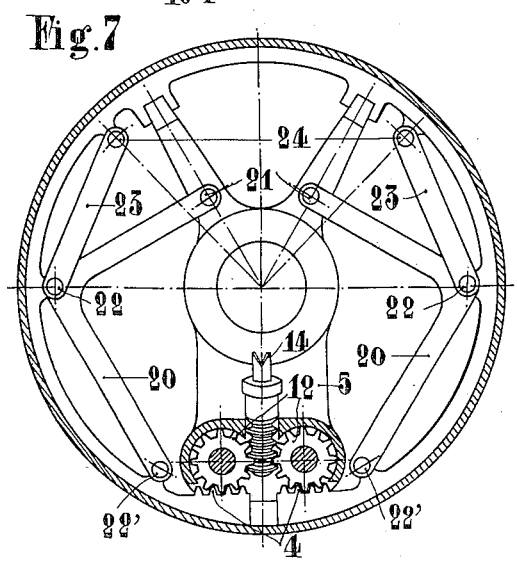
Figure 8:
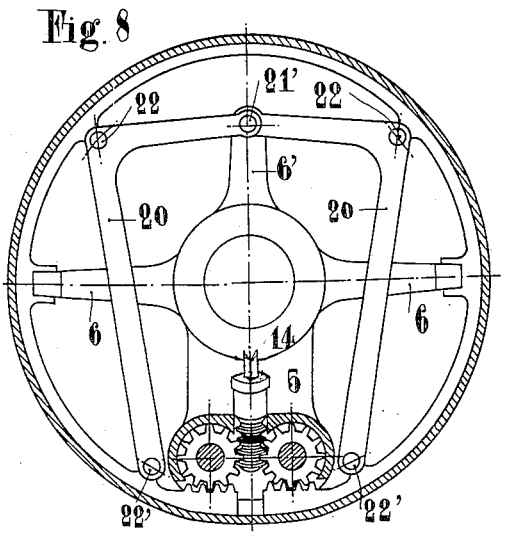

Figures 5 and 6 relate to modifications of the device illustrated in Figures 1, 2, 3 and 4;

Figure 7 is a modification showing a device including supplementary links;

Figure 8 shows another modification of the device illustrated in Figure 1 in which the links have a single pivoting point;

Figure 9 is an end view of a double brake applied to a nonsteering wheel.

Figure 10 is a view, partly sectional, partly in elevation of Figure 9, the section being according to line C—D of the latter figure.

In all these figures the brake is in released position.

In the brake illustrated in Figures 1, 2 and 3 (steering wheel braking), an open or split segment 1 housed in drum 3, as with ordinary brakes, is provided at each end with a rack 4 and is held in place by a support 5 having two branches 6 of known type, so constructed as to avoid any lateral shifting of the segment as well as friction thereof against the drum cheeks.

Support 5 is fitted at its lower part with two casings 9 and 10 in which are adapted to revolve, mounted on spindles 11, two toothed pinions 12 meshing with the racks 4. Between said pinions is arranged another rack 13, cylindrically grooved and carried by a rod 13' fixed to a control lever 26 and adapted to be shifted along the axis M—N of Figure 2 and thereby to rotate pinions 12 and to expand segment 1, thus braking the drum.

The shifting of rod 13', which shifting constitutes one of the essential characteristics of my invention, is obtained as follows:

The end of member 13' is provided with a double helicoidal surface or cam 14, with which is engaged a second double helicoidal surface or cam 15 of identical pitch formed on the end of a rod 16 passing through the end of the axle and secured thereto at 16'. Only the rod 13' carrying rack 13, is therefore adapted to be shifted.

As will be readily understood, when lever 26 is operated, considering that member 16 is fixed on the axle, surface 14 will tend to release surface 15 and rod 13' will be shifted to a certain extent, which will of course depend upon the wear on the brake, and will rotate the pinions in opposite direction to one another, said rotation causing braking as previously explained.

It should be noted that this device permits the steering wheels to be braked whatever their position or setting relative to the axis of the vehicle.

In order to avoid possible deformation of segment 1 and to ensure that the brake will wear evenly, there are provided two links 20 articulated on the one hand, at pivoting points 21 on branches 6 of support or cross piece 5 and, on the other hand, at 22 and 22', on the segment. Said pivot points 21, 22 and 22' of the links and the shape of the latter have to be so established that, however far apart its ends may be, the segment will always be concentric to the brake drum.

In the modification shown by Figure 7, I have provided two supplementary links 23 articulated at 22 and at 24 on the segment which add their action to that of links 20 and thus avoid any possible deformation of the part of the segment corresponding thereto.

In the embodiment illustrated by Figure 8, links 20 are of peculiar shape; they are articulated at 22 and at 22' on segment 1 and have a common pivoting point 21' on the end of an arm 6' of support 5. In this case arms 6 are set on segment 1 at 90° relative to support 5 and to arm 6', but obviously any other suitable arrangement may be adopted provided that, however far apart the ends of the segment, the latter be concentric to the drum.

Operation of the two brakes shown in Figures 7 and 8 is identically the same as with the Figure 1 brake.

Figures 9 and 10 illustrate a modification in which links 20 are articulated as in Figure 1 but since this double brake is intended to be mounted on nonsteering wheels, rack 13 is omitted and control is effected directly by two concentric spindles 35 and 36 operated by two levers 26' and 26''. This same mounting will of course do for a single brake.

In the embodiments shown by the appended drawings the expansion of the segments is obtained by means of racks and toothed pinions controlled by a cylindrically grooved rack.

Obviously the device could be designed quite otherwise.

In Figures 5 and 6 I have shown, always merely as an example, a modification of rack 13. Here I utilize a double rack 27 forming a sleeve in which is housed the control rod 13'.

Having now particularly described and ascertained the nature of my said invention as well as the manner in which the same is to be performed, what I claim as new is:

1. A wheel brake, comprising a brake drum; an expansible brake segment disposed within the drum for coaction with the wall thereof, said segment having its ends spaced apart and provided with racks; a support within the drum connected with the brake segment to maintain it in concentric relation with said drum wall; a pair of pinions meshing with said racks; and means for rotating said pinions to move the segment ends away from or toward each other.

2. A wheel brake, comprising a brake drum; an expansible brake segment disposed concentrically within the drum for coaction with the wall thereof, said segment having its ends spaced apart and provided with racks; a support within said drum; a pair of spindles journaled in parallel relation in said support and extending across the racks on the segment ends; a pair of pinions on said spindles meshing with said racks; and means for rotating said spindles to move the segment ends away from or toward each other.

3. A wheel brake, comprising a brake drum; an expansible brake segment disposed within the drum for coaction with the wall thereof, said segment having its ends spaced apart and provided with racks; a support within the drum connected with the brake segment to maintain it in concentric relation with said drum wall; a pair of pinions meshing with said racks; and an endwise-movable rack member disposed between said pinions and engaging both of them, so as to rotate them during its endwise movement and thereby force the segment ends away from or toward each other.

4. A wheel brake, comprising a brake drum; an expansible brake segment disposed within the drum for coaction with the wall thereof and having its ends spaced apart; a pair of operating devices positively engaged with the segment ends to force them away from or toward each other; and an endwise-movable member interposed between the two operating devices and positively engaging both of them to actuate them in unison during its endwise movement.

5. A wheel brake, comprising a brake drum; an expansible brake segment disposed within the drum for coaction with the wall thereof and having its ends spaced apart; a pair of operating devices positively engaged with the segment ends to force them away from or toward each other; and a controller embodying two members arranged end to end and having their confronting ends provided with coacting cams to effect an axial movement of one member when either member is rotated, said movable member being interposed between and positively engaged with both operating devices to actuate them in unison during its endwise movement.

6. A wheel brake, comprising a brake drum; an expansible brake segment disposed within the drum for coaction with the wall thereof and having its ends spaced apart; a pair of operating devices positively engaged with the segment ends to force them away from or toward each other; and a controller embodying a movable lower member disposed between and positively engaged with both operating devices, and a relatively fixed upper member, said members having their confronting ends provided with coacting cams to shift the lower member axially and thereby actuate said operating devices in unison when either member is rotated.

7. A wheel brake, comprising a brake drum, an expansible brake segment disposed within the drum for coaction with the wall thereof and having its ends spaced apart and provided with racks; a pair of pinions meshing with said racks for forcing the segment ends away from or toward each other when the pinions are rotated; and operating means for the pinions embodying a rack member interposed between and meshing with said pinions, and a relatively-fixed member arranged in endwise alinement with the rack member, said members having coacting cams on their confronting ends to cause an endwise movement of the rack member when one of said members is rotated.

8. A wheel brake, comprising a brake drum; an expansible brake segment disposed within the drum for coaction with the wall thereof and having its ends spaced apart; a support within the drum having a plurality of arms connected to said segment to maintain it in concentric relation to said drum wall; angular links disposed symmetrically to each other and pivotally connected to said support and segment to cause the latter to wear evenly; a pair of operating devices positively engaged with the segment ends to force them away from or toward each other; and a controller embodying two members arranged end to end and having their confronting ends provided with coacting cams to effect an axial movement of one member when either member is rotated, said movable member being interposed between and positively engaged with both operating devices to actuate them in unison during its endwise movement.

9. A wheel brake, comprising a brake drum, an expansible brake segment disposed concentrically within the drum for coaction with the wall thereof, said segment having its ends spaced apart and provided with racks; a support within said drum; a pair of spindles journaled in parallel relation in said support and extending across the racks on the segment ends; a pair of pinions on said spindles meshing with said racks; and an endwise-movable rack member disposed between said pinions and meshing with both of them, so as to rotate them in unison during its endwise movement and thereby force the segment ends away from or toward each other.

10. A wheel brake, comprising a brake drum; an expansible brake segment disposed concentrically within the drum for coaction with the wall thereof, said segment having its ends spaced apart and provided with racks; a support within said drum; a pair of spindles journaled in parallel relation in said support and extending across the racks on the segment ends; a pair of pinions on said spindles meshing with said racks; and operating means for the pinions embodying a rack member interposed between and meshing with said pinions, and a relatively-fixed member arranged in endwise alinement with the rack member, said members having coacting cams on their confronting ends to cause an endwise movement of the rack member when one of said members is rotated.

11. A wheel brake, comprising a brake drum; an expansible brake segment disposed within the drum for coaction with the wall thereof and having its ends spaced apart and provided with racks; a support within the drum having a plurality of arms connected with said segment to maintain it in concentric relation to said drum wall; angular links disposed symmetrically to each other and pivotally connected to said support and segment to cause the latter to wear evenly; a pair of pinions meshing with said racks; and means for rotating said pinions to move the segment ends away from or toward each other.

12. A wheel brake, comprising a brake drum; a split brake ring or segment disposed concentrically within the drum for engagement throughout its entire extent with the circumferential wall of the drum; a device operatively related to said ring to expand the same; a support within the drum; and connecting rods pivoted at their ends to the support and the brake ring and having their pivotal points so arranged as to maintain the concentric relation of said ring to said drum wall irrespective of the extent of expansion of the ring.

13. A wheel brake, according to claim 12, in which the connecting rods are angular and are pivoted at their apices to the brake ring and at the free ends of their arms to the support; substantially as described.

14. A wheel brake, according to claim 12, in which the connecting rods are angular and are pivoted at their apices to the brake ring and at the free ends of their arms to the support, and in which the ring-expanding device comprises a rectilinearly-movable member; substantially as described.

In testimony whereof I affixed my signature.

CHARLES SCHAEFFER.